(12) United States Patent
Bengs et al.

(10) Patent No.: US 6,593,470 B1
(45) Date of Patent: Jul. 15, 2003

(54) METHOD FOR THE PRODUCTION OF SMALL SPHERICAL PARTICLES CONTAINING AT LEAST ONE WATER-INSOLUBLE LINEAR POLYSACCHARIDE

(75) Inventors: Holger Bengs, Frankfurt am Main (DE); Jürgen Grande, Bad Soden (DE)

(73) Assignee: Celanese Ventures GmbH, Frankfurt am Main (DE)

( * ) Notice: Subject to any disclaimer, the term of this patent is extended or adjusted under 35 U.S.C. 154(b) by 0 days.

(21) Appl. No.: 09/786,141

(22) PCT Filed: Aug. 14, 1999

(86) PCT No.: PCT/EP99/05975

§ 371 (c)(1),
(2), (4) Date: May 30, 2001

(87) PCT Pub. No.: WO00/12589

PCT Pub. Date: Mar. 9, 2000

(30) Foreign Application Priority Data

Aug. 28, 1998 (DE) .......................................... 198 39 212

(51) Int. Cl.[7] .............................................. C08B 37/18
(52) U.S. Cl. .................................. 536/123.12; 536/55.1
(58) Field of Search .......................... 536/55.1, 123.12; 424/489, 499

(56) References Cited

U.S. PATENT DOCUMENTS

| 5,066,793 A | 11/1991 | Francotte et al. .............. 536/50 |
| 5,350,524 A | 9/1994 | Besnard et al. ............. 210/728 |
| 5,766,635 A | 6/1998 | Spenleuhauer et al. ..... 424/489 |

FOREIGN PATENT DOCUMENTS

| DE | 2 003 246 | 7/1971 | | |
| DE | 41 20 760 A1 | 3/1993 | | |
| DE | 19737481 A1 * | 3/1999 | .............. | C08J/3/14 |
| EP | 0 213 303 A2 | 3/1987 | | |
| EP | 0 316 270 A2 | 5/1989 | | |
| EP | 0 520 889 A1 | 12/1992 | | |
| WO | WO 88/08011 | 10/1988 | | |

OTHER PUBLICATIONS

"Preparation and Characterization of Chitosan Microspheres as Drug Carrier for Prednisolone Sodium Phosphate as Model for Anti–inflammatory Drugs", Berthold et al., Journal of Controlled Release 39 (1996) pp. 17–25.
International Search Report in PCT/EP99/05975 dated Dec. 21, 1999.
International Preliminary Examination Report in PCT/EP99/05975 dated Jul. 28, 2000.

\* cited by examiner

*Primary Examiner*—James O. Wilson
*Assistant Examiner*—Ganapathy Krishnan
(74) *Attorney, Agent, or Firm*—Marshall, Gerstein & Borun

(57) ABSTRACT

The present invention relates to a method for the production of small spherical particles consisting totally or partly of at least one water-insoluble linear polysaccharide by dissolving the at least one water-insoluble polysaccharide in a solvent or a solvent mixture, introducing the solution into a precipitating agent or a precipitating agent mixture, optionally cooling the mixture thus obtained and separating the formed small particles, wherein at least one poly alpha D-glucan soluble in hot water is used as auxiliary agent for precipitation. The invention also relates to the particles obtained according to said method.

20 Claims, 4 Drawing Sheets

3 μm

1 μm

3 μm

1 μm

3 μm

1 μm

3 μm

1 μm

Figure 1:
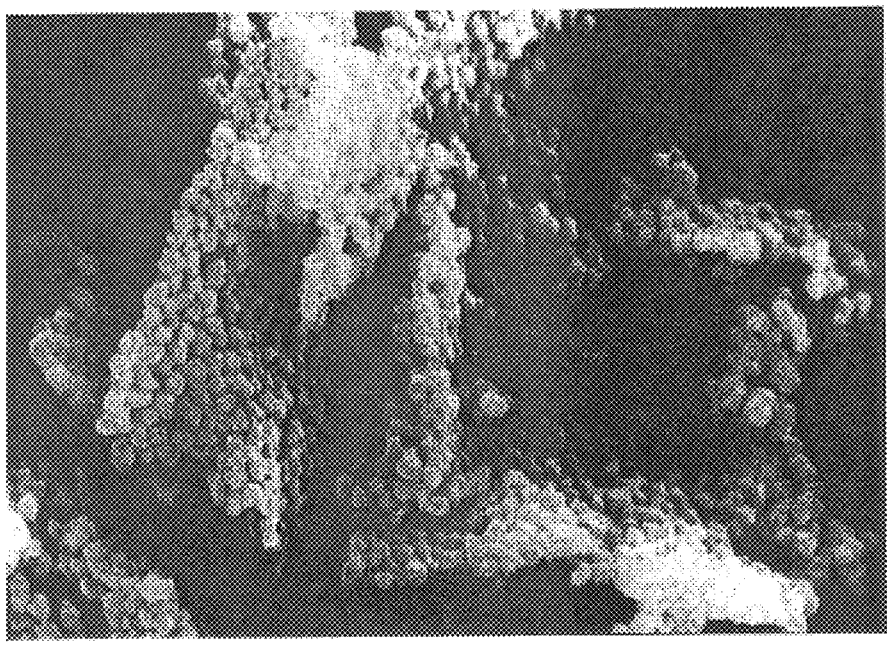

METHOD FOR THE PRODUCTION OF SMALL SPHERICAL PARTICLES CONTAINING AT LEAST ONE WATER-INSOLUBLE LINEAR POLYSACCHARIDE

This is the U.S. national phase of International Application No. PCT/EP99/05975 filed Aug. 14, 1999, the entire disclosure of which is incorporated herein by reference.

The present invention relates to a method for preparing small spherical particles which consist entirely or partly of at least one water-insoluble linear polysaccharide and also to particles obtainable by this method.

The applicant's German patent application No. 19737481.6 which has earlier priority but is not a prior publication describes methods for preparing spherical microparticles containing water-insoluble linear polysaccharides. This method can produce spherical microparticles which stand out in particular due to high uniformity with respect to their shape and their diameter distribution and also due to good mechanical properties. Owing to their comparatively uniform constitution and with simultaneously good mechanical properties, these particles may be employed for a multiplicity of applications.

It has, however, become apparent that, depending on the intended application, a specific optimization of particular particle properties may be desirable.

The abovementioned method can in particular produce particles with an average diameter of generally 1 μm or greater. There has been a need therefore to develop an optimized method which may be used for specifically preparing small particles whose average diameter does not exceed a few micrometers and is in particular in the nanometer range.

It was therefore an object of the present invention to provide a method which can be used for reproducibly producing in a simple manner water-insoluble spherical particles which contain linear polysaccharides and which have, aside from a regular shape, uniform diameter distribution and also good mechanical properties, a particularly small average diameter which does not exceed a few micrometers and which is preferably in the nanometer range.

This object is achieved by a method for preparing small spherical particles which consist entirely or partly of at least one water-insoluble linear polysaccharide by dissolving the at least one water-insoluble linear polysaccharide in a solvent or solvent mixture, introducing the solution formed into a precipitant or precipitant mixture, where appropriate cooling the mixture being produced in the process and removing the particles formed, wherein at least one hot-water-soluble poly-alpha-D-glucan is used as a precipitation aid.

The present invention further relates to small spherical particles as obtainable according to the abovementioned method.

In this respect, the present invention means an advantageous inventive development of the abovementioned German patent application No. 19737481.6 whose contents are incorporated in their entirety by way of reference for the purposes of the present invention.

Although said application also discusses the use of precipitation aids, there is no information on the use of hot-water-soluble poly-alpha-D-glucan, in particular no information on using such compounds in order to specifically control the size of the particles.

Figure 2:
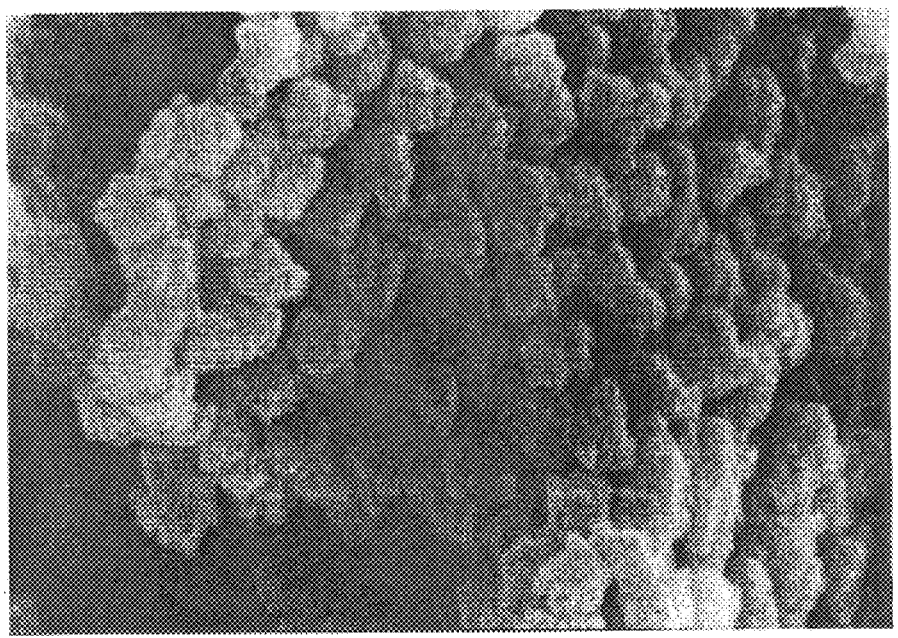
Figure 3:
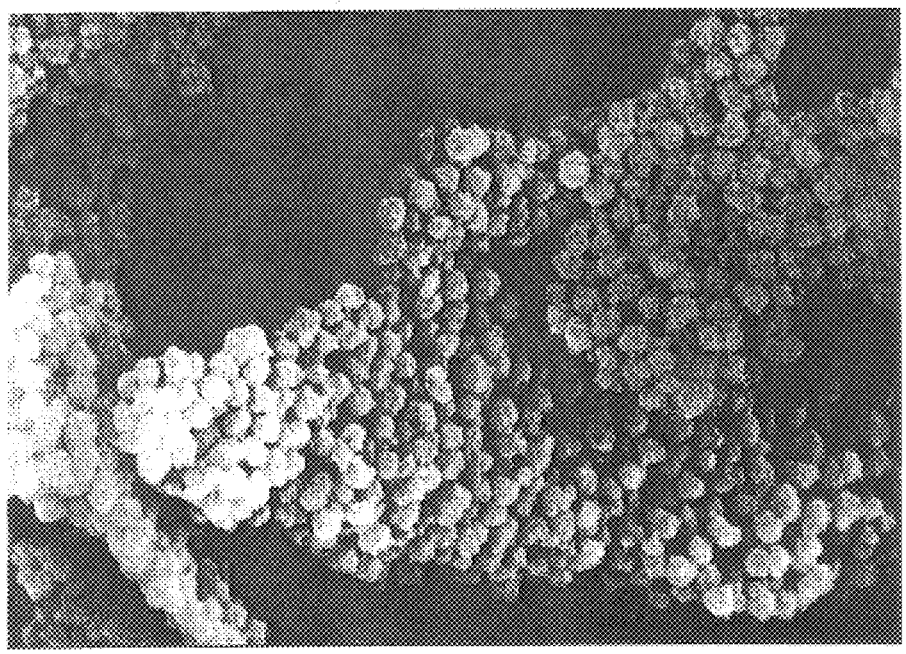
Figure 4:
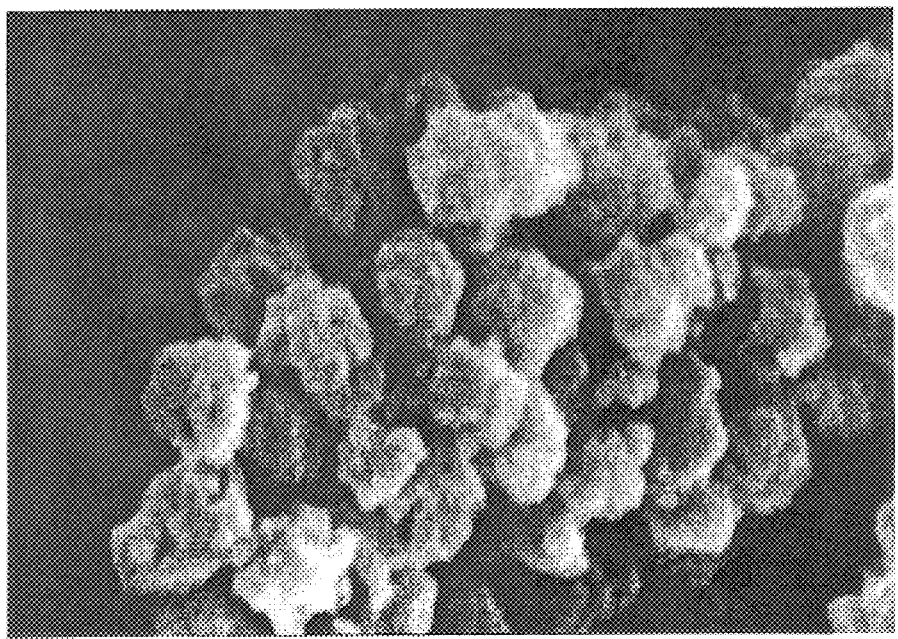
Figure 5:
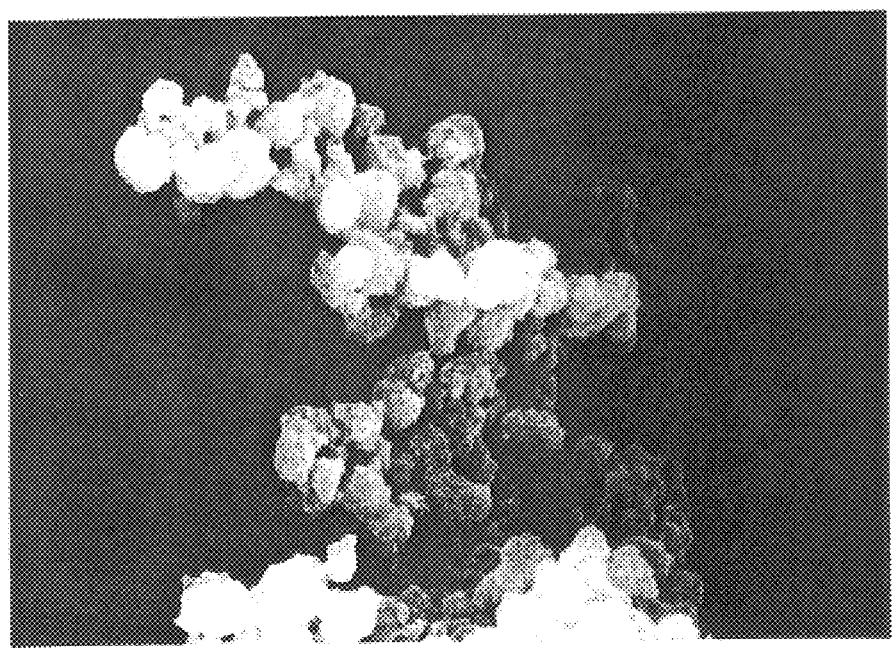
Figure 6:
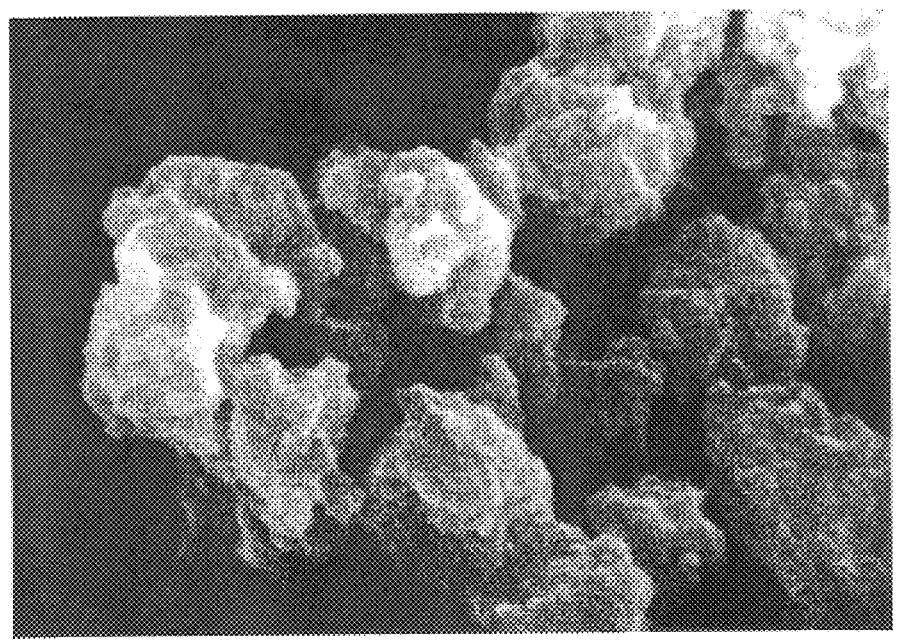
Figure 7:
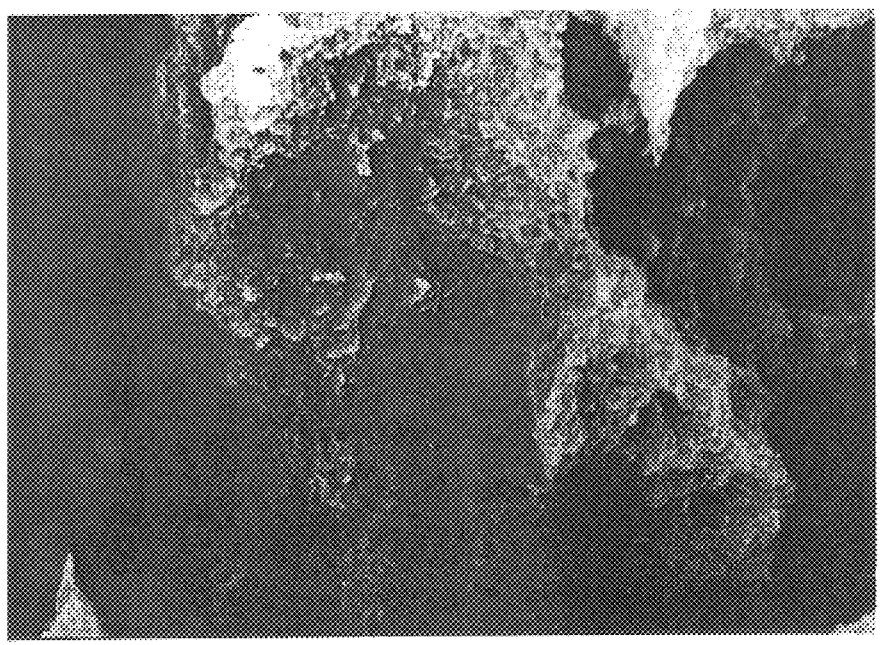
Figure 8:
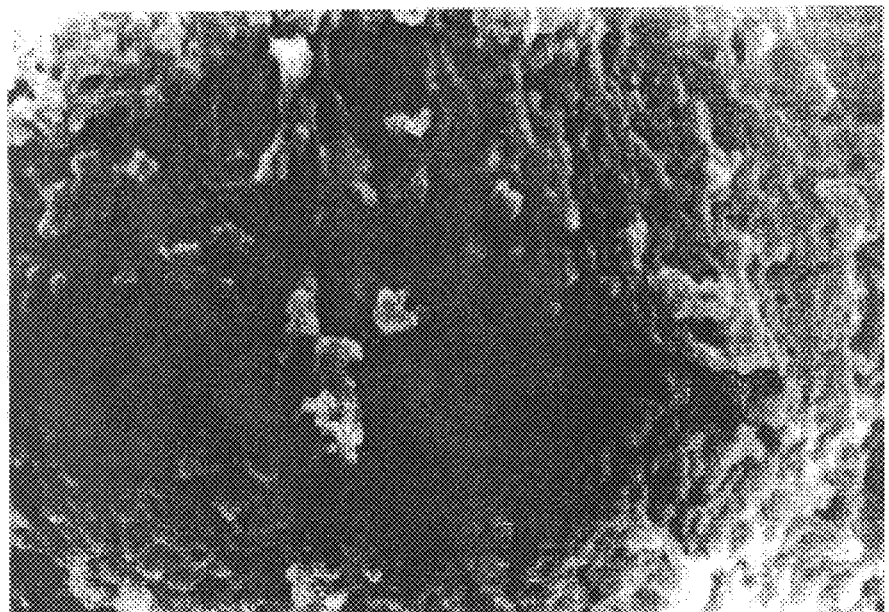

FIGS. 1 to 8 show scanning electron micrographs (SEM, Camscan S-4) of spherical particles:

FIG. 1: particles of the invention according to Example 1, magnification 5000×, FIG. 2: particles as in FIG. 1, magnification 20 000×, FIG. 3: particles of the invention according to Example 2, magnification 5000×, FIG. 4: particles of the invention according to FIG. 3, magnification 20 000×, FIG. 5: particles according to Comparative Example 1, magnification 5000×, FIG. 6: particles according to FIG. 5, magnification 20 000×, FIG. 7: particles according to Comparative Example 3, magnification 5000×, and FIG. 8: particles according to FIG. 7, magnification 20 000×.

Linear water-insoluble polysaccharides in accordance with the present invention are polysaccharides composed of monosaccharides, disaccharides or other monomeric components such that the individual components are always linked to each other in the same way. Each base unit or component defined in this way has exactly two linkages, each one to another monomer. The only exceptions are the two base units forming the start and the end of the polysaccharide which have only one linkage to another monomer.

Examples of preferred water-insoluble linear polysaccharides are linear poly-D-glucans in which the type of linkage is unimportant, as long as linearity in accordance with the invention is present. Examples are poly(1,4-alpha-D-glucan) and poly(1,3-beta-D-glucan), poly(1,4-alpha-D-glucan) being particularly preferred.

If the base unit has three or more linkages, then this is referred to as branching. The number of hydroxyl groups per 100 base units, which are not involved in constructing the linear polymer backbone and which form branchings, constitutes the so-called degree of branching.

According to the invention, the linear water-insoluble polysaccharides have a degree of branching of less than 8%, i.e. less than 8 branchings per 100 base units. The degree of branching is preferably less than 4% and in particular not more than 1.5%.

If the water-insoluble linear polysaccharide is a polyglucan, for example poly(1,4-alpha-D-glucan), then the degree of branching at position 6 is less than 4%, preferably not more than 2% and in particular not more than 0.5%, and the degree of branching at the other positions, for example at positions 2 and 3, is preferably not more than 2% and in particular not more than 1%.

Particular preference is given to polysaccharides, in particular poly-alpha-D-glucans, which have no branchings or whose degree of branching is so minimal as to be undetectable by conventional methods.

According to the invention, the prefixes "alpha", "beta" or "D" refer solely to the linkages forming the polymer backbone and not to the branchings.

For the present invention, the term "water-insoluble polysaccharides" means compounds which according to the definition of the Deutsches Arzneimittelbuch [German Pharmacopeia] (DAB—Deutsches Arzneimittelbuch, Wissenschaftliche Verlagsgesellschaft mbH, Stuttgart, Govi-Verlag GmbH, Frankfurt, 9th edition, 1987) are classified as "sparingly soluble", "slightly soluble", "very slightly soluble" and "practically insoluble", corresponding to classes 4 to 7.

For the present invention, preference is given to from slightly soluble to practically insoluble compounds, in particular to from very slightly soluble to practically insoluble compounds.

In the case of the polysaccharides used according to the invention, this means that preferably at least 98% of the amount employed, in particular at least 99.5%, are insoluble in water (corresponding to classes 4 and 5, respectively) under standard conditions (T=25° C.+/−20%, p=101 325 Pascal+/−20%).

The following protocol may illustrate "very slightly soluble", corresponding to class 6:

One gram of the polyglucan/polysaccharide to be studied is heated to 130° C. in 1 l of deionized water at a pressure of 1 bar. The solution forming remains stable only briefly for a few minutes. During cooling under standard conditions, the substance precipitates again. After cooling to room temperature and separation by means of centrifugation, at least 66% of the amount employed can be recovered, taking into account experimental losses.

The polysaccharides employed according to the invention may be of any origin, as long as the abovementioned conditions with respect to the terms "linear" and "water-insoluble" are met.

They may have been obtained naturally or via biotechnology.

They may be produced, for example, from natural plant or animal sources by isolation and/or purification.

It is also possible to use sources which have been genetically manipulated such that they contain a higher proportion of unbranched or comparatively slightly branched polysaccharides than the unmanipulated source.

They may have been prepared from non-linear polysaccharides by enzymatic or chemical debranching.

Biotechnological methods comprise biocatalytic, also biotransformation, or fermentation processes.

WO 95/31553, for example, describes an advantageous method for the biotechnological production.

Modified water-insoluble linear polysaccharides may also be used, it being possible for the polysaccharides to have been chemically modified, for example by esterification and/or etherification at one or more of the positions not involved in the linear linkage. In the case of the preferred 1,4-linked polyglucans, modification may take place at positions 2, 3 and/or 6. Measures for such modifications are well known to the skilled worker.

Thus linear polysaccharides such as pullulans, pectins, mannans or polyfructans, which are water-soluble or swellable per se, can be made water-insoluble through modification.

It is further possible to use so-called alpha-amylase-resistant polysaccharides as described, for example, in the German patent application No. 198 30 618.0.

Further suitable examples for water-insoluble linear polysaccharides and also a detailed explanation with respect to the preparation methods thereof are to be found in the German applications of the same applicant, Nos. 197 37 481.6, 198 03 415.6, 198 16 070.4, 198 30 618.0 and 198 27 978.7 which have earlier priority but are not prior publications and which are explicitly referred to here.

The molecular weights $M_W$ (weight average, determined by means of gel permeation chromatography and comparison with a calibration using a pullulan standard) of the linear polysaccharides used according to the invention may vary within a wide range from $10^3$ g/mol to $10^7$ g/mol. The molecular weight $M_w$ preferably is in the range from $10^4$ g/mol to $10^5$ g/mol and particularly preferably from $2\times10^4$ g/mol to $5\times10^4$ g/mol. Another advantageous range is from $2\times10^3$ g/mol to $8\times10^3$ g/mol. Corresponding ranges apply to the preferably used poly-D-glucan and poly(1,4-a-D-glucan).

The molecular weight distribution or polydispersity $M_W/M_N$ may likewise vary widely, depending on the polysaccharide preparation method. Preferred ranges are from 1.01 to 50, and in particular from 1.5 to 15. Polydispersity increases with a bimodal molecular weight distribution.

For the method of the invention, a single linear polysaccharide substance, in particular linear poly-D-glucan, preferably poly(1,4-a-D-glucan), or mixtures of two or more representatives may be used.

The hot-water-soluble poly-alpha-D-glucans used as precipitation aids according to the invention are likewise polysaccharides. In contrast to water-insoluble linear polysaccharides, they may contain branchings and form no alpha-amylase-resistant polysaccharides having a resistant-starch content (RS content) of 65% or greater.

Like the water-insoluble linear polysaccharides used as starting materials, they may be of any origin. They may have been obtained from natural sources such as, for example, plants or animals, through technical or biotechnological methods, for example through biocatalysis or fermentation.

The poly-alpha-D-glucans used according to the invention may be obtained from genetically or biotechnologically modified plants.

The genetic or biotechnological modification may lead, for example, to the production of a polyglucan having a relatively large linear proportion or to a relatively easy separation of the containing polyglucans.

They may have been modified at those positions not involved in linkages, for example by etherification, esterification or oxidation or by other suitable methods.

It is also possible to use degradation products of relatively large polymer molecules.

The poly-alpha-D-glucans may be subjected to further processing methods, for example purification methods for isolating unwanted by-products or increasing the linear structures.

Using debranching techniques may also increase the linear structures, as described, for example, for the water-insoluble linear polysaccharides.

It goes without saying that all production measures suitable for water-insoluble linear polysaccharides can likewise be applied to hot-water-soluble poly-alpha-D-glucans.

Preferred representatives of the hot-water-soluble poly-alpha-D-glucans used for the method of the invention are native or chemically modified starches, poly-alpha-D-glucans obtained from said starches, and also starch-like compounds.

A group of starches which may be used within the framework of the invention comprises starches obtained from plant raw material. These include inter alia starches from tubers such as potatoes, cassavas, arrowroots, yams, from seeds such as wheat, maize, rye, rice, barley, millet, oat, sorghum, from fruits such as chestnuts, acorns, beans, peas and similar pulses, bananas, and also from pith, for example of the sago palm.

The starches obtainable from plant raw material usually and essentially comprise amylose, a poly(1,4-alpha-D-glucan), and amylopectin, a poly(1,4-alpha-D-glucan) with 1,6 branchings, in variable quantitative ratios.

For example, starch from potatoes contains approx. 20% by weight of amylose and approx. 80% by weight of amylopectin, while starch from maize contains approx. 50% by weight of amylose and approx. 50% by weight of amylopectin.

Starch-like compounds mean compounds which comprise poly-alpha-D-glucans but which are not from plants. Examples are glycogen, a poly-alpha-D-glucan which corresponds to amylopectin and which is of animal origin, and dextran which is obtained from bacteria.

The hot-water-soluble poly-alpha-D-glucans may be employed as a mixture of a linear and a branched proportion, as in starch, for example. In this case, the proportion of linear poly-alpha-D-glucan should be greater than 15% by weight, preferably 50 to 99.5% by weight, in particular 60 to 90% by weight and very particularly preferably 65 to 80% by weight, with respect to the total amount of poly-alpha-D-glucan in the precipitant.

They may, however, also comprise branched structures, as in amylopectin or in glycogen, for example. A branched structure is present if the degree of branching is greater than indicated above for the linear polysaccharides.

In the context of the present invention, "hot-water-soluble" means that the poly-alpha-D-glucans are essentially insoluble at room temperature, with the same standard being applied as for the term "water-insoluble" in connection with linear polysaccharides. The term "solution" or "solubility" means in particular also suspensions or formation of suspensions like those appearing when dissolving starch.

For example, the hot-water-soluble starches preferred according to the invention have negligible solubility in water at room temperature, while the so-called cold-water-soluble starches are more freely soluble under these conditions.

Hot-water-soluble starches are characterized in particular by forming solutions when heated under autogenous pressure, for example in an autoclave, to a temperature in the range from about 100 to about 160° C., the particular temperature depending on the type of starch.

It is, for example, possible to dissolve potato starch completely at about 100° C., while maize starch requires appr. 125° C.

For the method of the invention, the hot-water-soluble poly-alpha-D-glucans are preferably added at maximum concentration to the precipitant, i.e. a saturated solution is prepared.

Further suitable ranges are from greater than 0.001% by weight to 10% by weight, preferably from 0.01 to 2% by weight, and in particular from 0.05% by weight to 0.5% by weight, with respect to the amount of precipitant used.

According to a further embodiment, the linear water-insoluble polysaccharide(s) may also be admixed with other polymers, in particular other biocompatible or biodegradable polymers. The amount of the other polymer(s) which is (are) admixed without changing the spherical shape and/or other properties of the particles to be prepared, always depends on the polymer added. The amount may be up to 10% or more, with respect to the total amount of water-insoluble polysaccharide employed, i.e. linear or, where appropriate, branched (as indicated in the following), and also less in particular cases. The maximum amount allowed depends on the particular individual case and can be readily determined by a skilled worker through standard experiments.

The further polymer may be a water-insoluble branched polysaccharide, preferably a polyglucan, in particular a poly(1,4-alpha-D-glucan) or a poly(1,3-beta-D-glucan). The water-insoluble branched polysaccharide may also be a hot-water-soluble poly-alpha-D-glucan as can be employed as precipitation aid according to the invention.

In this context, the degree of branching is negligible. The proportion of branched polysaccharide, however, should not exceed 30% by weight, preferably 20% by weight and in particular 10% by weight, with respect to the total amount of water-insoluble polysaccharide.

It is also possible to add mixtures of two or more branched polysaccharides.

The branched polysaccharides may be of any origin. In this connection, the explanations on this matter for the linear polysaccharides are referred to. Preferred sources are starch and starch analogs such as glycogen. If required, suitable concentration methods may increase the proportion of linear structures in the branched polysaccharides.

Regarding water-insolubility and essentially also molecular weight, the same information applies as for the linear polysaccharide, but the molecular weight of the branched polysaccharides may be higher than indicated for the water-insoluble linear polysaccharides.

Examples of precipitants are water, dichloromethane, a mixture of water and dichloromethane, mixtures of water and alcohols such as methanol, ethanol, isopropanol, with water and also a mixture of water and dichloromethane being particularly preferred.

To prepare the particles of the invention, the starting materials such as the at least one linear polysaccharide and, where appropriate, further polymers, etc. are dissolved in a solvent. Examples of suitable solvents are dimethyl sulfoxide (DMSO), formamide, acetamide, N,N-dimethylformamide, N,N-di-methylacetamide, N-methylmorpholine N-oxide in the presence of water, further N-substituted morpholine N-oxides, aqueous solutions with high or low pH, or mixtures of the abovementioned solvents, DMSO being particularly preferred. It is also possible, of course, to use other solvents familiar to the skilled worker for this purpose.

The total concentration of linear polysaccharide in the solvent may vary within wide limits according to demand. It is preferably in a range from 0.02 g (linear polysaccharide)/ml (solvent) to 1.0 g/ml, in particular from 0.05 g/ml to 0.8 g/ml and particularly preferably from 0.3 g/l to 0.6 g/l.

The solvent/precipitant ratio is preferably in a range from 1:1000 to 1:4 (part of solvent/parts of precipitant) preferably 1:100 to 1:10 and in particular 1:70 to 1:30.

According to a preferred embodiment, the solution containing the starting materials is combined with the precipitant at from 20° C. to 50° C.

If mixing takes place at an elevated temperature, then the mixture being produced may subsequently be cooled, if required.

The order in which solvent and precipitant are combined, for example whether the precipitant is added to the solvent or vice versa, is unimportant. It is, however, important to ensure rapid mixing.

The temperature during the precipitation process is generally maintained at from plus 10° C. to minus 10° C., preferably plus 5° C. and minus 5° C. A higher or lower temperature may be chosen, if required.

The precipitation process may be carried out relatively slowly at low temperature overnight. It can be influenced and controlled by varying the temperature and the precipitant. If the mixture of solvent and precipitant is cooled, it must be ensured that said mixture stays liquid and does not solidify.

Furthermore, addition of other precipitation aids may affect process control and also particle properties such as size etc.

Examples of suitable precipitation aids which may be employed aside from the hot-water-soluble poly-alpha-D-glucan are surfactants such as sodium dodecyl sulfate, N-methylgluconamide, polysorbates (e.g. Tween (trademark)), alkyl polyglycol ethers, ethylene oxide/propylene oxide copolymers (e.g. Pluronic (trademark)), alkyl polyglycol ether sulfates, generally alkyl sulfates and glycol fatty esters, sugars such as, for example, fructose, sucrose, glucose and water-soluble cellulose derivatives.

The surfactants may be anionic, cationic or nonionic.

It is possible to produce particularly regular, i.e. smooth, surfaces by adding water-soluble cellulose derivatives. It is in principle possible to use any water-soluble cellulose derivative, as long as it is suitable as a precipitation aid. The celluloses in this case may be chemically modified celluloses of any kind. Examples are cellulose esters and cellulose ethers and mixed forms thereof. Specific representatives are, for example, hydroxypropylmethyl-celluloses, hydroxyethylcelluloses, carboxymethyl-celluloses, cellulose acetates, cellulose butyrates, cellulose propionates, cellulose acetobutyrates, cellulose acetopropionates, cellulose nitrates, ethyl-celluloses, benzylcelluloses, methylcelluloses etc.

Mixtures of different water-soluble cellulose derivatives may also be employed.

For the present invention, the term "water-soluble cellulose derivatives" means compounds classified as very soluble to slightly soluble according to the definition of the Deutsches Arzneimittelbuch [German Pharmacopeia] (DAB=Deutsches Arzneimittelbuch, Wissenschaftliche Verlagsgesellschaft mbH, Stuttgart, Govi-Verlag GmbH, Frankfurt, 9th edition, 1987).

Usually, these other aids are likewise added to the precipitant. The amount used depends on the particular individual case and also on the desired particle properties, and the skilled worker is familiar with determining the advantageous amount for each case.

Concentrations proven to be advantageous are from 2 g (aid)/l (precipitant) to 150 g/l, and preferably from 5 g/l to 80 g/l and in particular 80 g/l to 20 g/l. These values in particular apply also to the water-soluble cellulose derivative.

The spherical particles which are obtainable according to the method of the invention and which this invention likewise relates to, have a uniform spherical shape, narrow size distribution and good mechanical properties, like the microparticles described in the German patent application No. 19737481.6. In addition, using the hot-water-soluble poly-alpha-D-glucans as precipitation aids makes it possible to optimize the method in the direction of small particles and preferably into the nanometer range.

Thus, the particles of the invention generally have average diameters (dn, number average) of from 100 nm to 2 $\mu$m, preferably 250 nm to 1.3 $\mu$m and particularly preferably 500 nm to 1.0 $\mu$m.

Spherical in accordance with the invention means that the particles have nearly a spherical shape. If a sphere is described by axes of identical length which start from a common origin, are directed into space and define the radius of the sphere in all spatial orientations, the length of the axes may deviate from an ideal spherical state by from 1% to 40% for the spherical particles. Preferably, spherical particles with deviations of up to 25% are obtained, particularly preferably up to 15%.

The surface of the spherical particles can be macroscopically compared to a raspberry, with the depth of the irregularities on the particle surface, such as recesses or indentations, being not more than 20% of the average diameter of the spherical microparticles.

Furthermore, the particles of the invention preferably show a dispersity D=weight average diameter($d_w$)/number average diameter($d_n$) of from 1.0 to 10.0, preferably from 1.5 to 5.0 and in particular from 2.0 to 3.0.

The averages used herein are defined as follows:

$d_n = n_i \times d_i/n_i$ = number average
$d_w = n_i \times d_i^2/n_i \times d_i$ = weight average
$n_i$ = number of particles with diameter $d_i$,
$d_i$ = a particular diameter,
i = serial parameter.

The term weight in this connection represents a weighted average. The larger diameters are given greater importance.

It goes without saying that the particles obtainable by the method of the invention are suitable for all applications as listed in the German patent applications Nos. 19737481.6, 19803415.6, 19816070.4 or 19816085.2 which have earlier priority but are not prior publications.

Thus, they can be employed in pure form or as vehicles for active substances in the widest sense, for example as additives for cosmetics in ointments, dusting powders, creams, pastes etc., as vehicles for active substances in pharmaceutical, animal experimental and other similar applications, as smoothing agents, for example for closing pores or smoothing flashes, as food additive, for example as bulking component or for improving rheological properties, as additive for upgrading, for example, emulsion polymers, as separation aids, for example in the removal of impurities, as encapsulating material, as vehicles for magnetic particles etc., as filler, in particular for biodegradable polymers or industrial polymers, for example for controlling properties, as additive for controlling properties, for example the porosity, the weight, the color etc., as particle standard for calibration or determination of the particle size of unknown materials etc., as vehicle material for the controlled, e.g. slow, release of active substances, as bulking agent for improving the properties of industrial or biocompatible polymers, in diagnostic tests, for example as ultrasound agent.

Owing to their natural origin, most of the water-insoluble linear polysaccharides used according to the invention and of the degradation products thereof, in particular polyglucans such as poly(1,4-alpha-D-glucan), are biocompatible and biodegradable. They are well tolerated in tissues and do not accumulate in the animal, in particular human, body. Biodegradation means in this context any in vivo process leading to degradation or destruction of substances, in this case polysaccharides.

These properties of biocompatibility and biodegradability are particularly advantageous for uses concerning human or animal organisms, for example in medicine, pharmacy or cosmetics.

The following examples explain the invention in more detail. These examples are for illustration purposes and are not limiting.

EXAMPLES 1, 2

Comparative Example 1 a. Preparation of the Precipitation Solution 100 ml of deionized water were added to in each case 100 mg of the hot-water-soluble starches listed in Table 1. The suspension obtained was heated to approx. 90° C. with stirring until a 0.1% strength aqueous solution was obtained.

b. Preparation of the Particles 1.0 g of poly(1,4-alpha-D-glucan) was in each case dissolved in 5 ml of dimethyl sulfoxide (DMSO, analytical grade, from Riedel-de-Haen) at 60° C. The DMSO solutions were added dropwise and with stirring to in each case 100 ml of the precipitant prepared under a. within a few seconds. The mixtures obtained were stored at 5° C. for 16 hours. In each case, a fine white precipitate of particles developed in the form of a milky suspension. The particles were removed by homogeneously suspending each mixture and subsequent centrifugation at 3000 revolutions per minute for about 15 minutes (Labofuge GL from Herarus). The solid residue of each mixture was resuspended in double-distilled water three times in total and again centrifuged. The solid obtained in this process was resuspended in approx. 10 ml of double-distilled water, frozen and lyophilized (Christ Delta 1–24 KD freeze-dryer).

The results are listed in the following Table 1.

TABLE 1

|  | Type of starch | Amylose content (%) | Yield (%) |
| --- | --- | --- | --- |
| Example 1 | Maize Hylon VII* | 70 | 73 |
| Example 2 | Maize Starch* | 20 | 80 |
| Comparative Example 1 | Amioca powder* | <1 | 64 |

*each from National Starch Chemistry

Characterization of the spherical particles obtained in Examples 1 and 2 and in Comparative Example 1 was carried out by means of scanning electron micrographs (SEM; Camscan S-4), see FIGS. 1 to 6.

The results are listed in Table 2.

TABLE 2

|  | Example 1 | Example 2 | Comparative example 1 |
| --- | --- | --- | --- |
| Size | 0.5 µm | 0.5–1.0 µm | 1.0–2.0 µm |
| Shape | spherical | Spherical | irregular |
| Surface characteristics (max. depth) | smooth, i.e. < 20% dn | Smooth, i.e. < 20% dn | Rough, i.e. > 20% dn |
| Particle | unique | unique | partly fused |

Comparative Examples 2 and 3

Preparation of particles without addition of starch to the precipitant and with addition of cold-water soluble starches The preparation was carried out essentially as in Examples 1 and 2. The starch concentration in the precipitant was 0.1% in each case.

The results listed in Table 3 clearly show the effect of starch as precipitation aid with respect to particle size and shape.

TABLE 3

|  | Comparative Example 2 | Example 1 | Comparative example 3 |
| --- | --- | --- | --- |
| Starch | without | q.v. | Crisp Film* |
| Size | 1.0–2.0 µm | 0.5 µm | >2.0 µm |
| Shape | Spherical | Spherical | spherical |
| Surface characteristics (max. depth) | Smooth, i.e. < 20% $d_n$ | Smooth, i.e. < 20% $d_n$ | Rough, i.e. > 20% $d_n$ |
| Particle | Unique | unique | Partly fused |

*cold-water soluble starch from National Starch Chemistry (amylose content: approx. 50%).

What is claimed is:

1. A method for preparing spherical particles comprising at least one water-insoluble linear polysaccharide, said method comprising the steps of
    (a) dissolving the at least one water-insoluble linear polysaccharide in a solvent or solvent mixture to form a solution,
    (b) introducing the solution into a precipitant or precipitant mixture to form a polysaccharide-precipitant mixture containing polysaccharide particles, and where appropriate cooling the polysaccharide-precipitant mixture, and
    (c) removing the particles formed, wherein at least one hot-water-soluble poly-alpha-D-glucan is used as a precipitation aid.

2. The method as claimed in claim 1, wherein the hot-water-soluble poly-alpha-D-glucan is derived from a natural source.

3. The method as claimed in claim 2, wherein the natural source is a plant or an animal.

4. The method as claimed in claim 1, wherein the poly-alpha-D-glucan is a native starch.

5. The method as claimed in claim 1, wherein the poly-alpha-D-glucan is glycogen.

6. The method as claimed in claim 1, comprising chemically modifying the poly-alpha-D-glucan prior to forming said mixture.

7. The method as claimed in claim 1, wherein the hot-water-soluble poly-alpha-D-glucan is a mixture of a linear polyglucan and a branched polyglucan.

8. The method as claimed in claim 7, wherein the content of the linear poly-alpha-D-glucan in the poly-alpha-D-glucan mixture is greater than 15% by weight relative to the total weight of poly-alpha-D-glucan.

9. The method as claimed in claim 8, wherein the content of the linear poly-alpha-D-glucan in the poly-alpha-D-glucan mixture is between 50% and 99.5% by weight relative to total weight.

10. The method as claimed in claim 1, wherein the hot-water-soluble poly-alpha-D-glucan is present in the precipitant in the form of a saturated solution.

11. The method as claimed in claim 1, which comprises the steps of mixing the solution and the precipitant at from 20 to 50° C. and cooling the mixture being produced to from plus 10° C. to minus 10° C.

12. The method as claimed in claim 10, which comprises the step of cooling the polysaccharide-precipitant mixture to a temperature in the range of plus 5° C. to minus 5° C.

13. The method as claimed in claim 1, wherein the precipitant comprises water.

14. The method as claimed in claim 1, wherein the solvent is dimethyl sulfoxide.

15. The method as claimed in claim 1, wherein the water-insoluble linear polysaccharide is a linear polyglucan.

16. The method as claimed in claim 1, wherein the water-soluable linear polysaccharide is poly(1,4-alpha-D-glucan).

17. The method as claimed in claim 1, wherein the water-insoluble linear polysaccharide is poly(1,3-beta-D-glucan).

18. The method as claimed in claim 1, comprising chemically modified the water-insoluble linear polysaccharide prior to forming said mixture.

19. The method as claimed in claim 18, wherein the polysaccharide has been esterified and/or etherified at at least one of the positions not involved in forming the polymer chain.

20. The method as claimed in claim 19, wherein the polysaccharide has been esterified and/or etherfied at at least one of positions 2, 3 and 6.

* * * * *